United States Patent Office 3,349,082
Patented Oct. 24, 1967

3,349,082
MANNICH BASES OF RIFAMYCIN SV
Nicola Maggi and Piero Sensi, Milan, Italy, assignors to Lepetit S.p.A., Milan, Italy
No Drawing. Filed Mar. 23, 1965, Ser. No. 442,166
Claims priority, application Great Britain, Apr. 2, 1964, 13,653/64; Oct. 29, 1964, 44,180/64
9 Claims. (Cl. 260—239.3)

The present invention relates to new antibiotic substances and the process for their preparation. In U.S. Patent 3,150,046 the preparation of the antibiotic rifamycin by fermentation of a strain of Str. mediterranei ATCC 13658 is described. As stated in said U.S. patent rifamycin is a mixture of antibiotic substances. One of these substances, rifamycin B, having the crude formula $C_{39}H_{49}NO_{14}$ is a diacid (pH 1½=2.8, pH 2½=6.7) and one of the acidic groups is a carboxyl group. One of the particular properties of this antibiotic is its increase in activity when dissolved in water, i.e. to turn into another substance having higher antibacterial activity. The more active product, called rifamycin S, has the crude formula $C_{37}H_{45}NO_{12}$ and by mild reduction can be converted into another new antibiotic of the rifamycin class, rifamycin SV ($C_{37}H_{47}NO_{12}$). The process for preparing rifamycin SV comprises oxidation of rifamycin B to rifamycin O, hydrolysis of rifamycin O to rifamycin S with release of glycolic acid and reduction of rifamycin S to rifamycin SV. Both rifamycin S and rifamycin SV lack the carboxyl group which is set free in the form of glycolic acid during the activation step.

The structure of the rifamycins has been recently elucidated by Prelog and co-workers (communication at the Chemistry and Biochemistry of Fungi and Yeasts Congress which was held in Dublin on July 18, 1963) which established for rifamycin B the following structure:

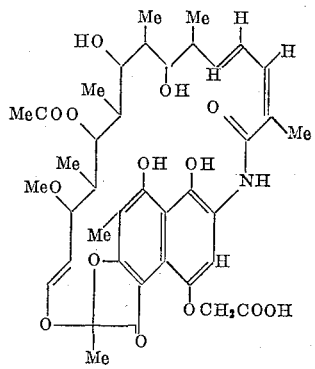

The above formula explains of course how rifamycins O, S and SV are produced from rifamycin B. The sequence of such modifications may be illustrated by considering solely the naphthalene ring present in the molecule:

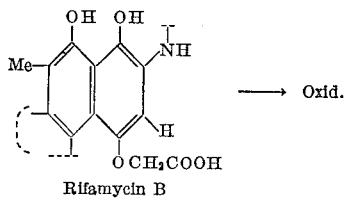

Rifamycin B

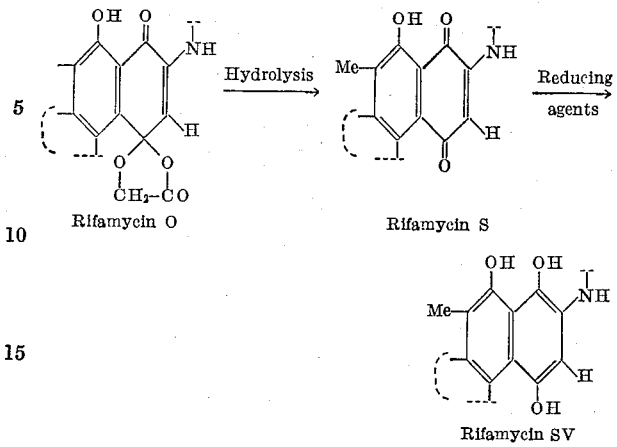

Rifamycin O     Rifamycin S

Rifamycin SV

The present invention is concerned with new derivatives of rifamycin SV in which the hydrogen atom at position 3 is substituted by the group

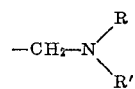

wherein R is lower alkyl and R′ is a member of the class consisting of lower alkyl, hydroxy-lower alkyl, carboxy-lower alkyl and cycloalkyl groups, or R and R′ taken together with the nitrogen atom form a heterocyclic group of the formula

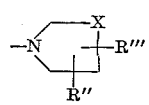

wherein X is a member of the class consisting of methylene, ethylene, the group —CH$_2$O— and the group —CH$_2$NH—, and R″ and R‴ are members of the class consisting of hydrogen, lower alkyl, hydroxy and carboxy groups.

The process for preparing the new derivatives consists in refluxing rifamycin S in an inert organic solvent with at least two equimolecular amounts of formaldehyde and an excess over an equimolecular amount of a secondary nitrogen base selected from an amine of the formula

wherein R is lower alkyl, R′ is a member of the class consisting of lower alkyl, hydroxy-lower alkyl, carboxy-lower alkyl and cycloalkyl groups and a heterocyclic compound of the formula

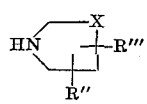

wherein X is a member of the class consisting of methylene, ethylene, the group —CH$_2$O— and the group —CH$_2$NH—, R″ and R‴ are members of the class consisting of hydrogen, lower alkyl, hydroxy and carboxy groups, and contacting the obtained aminomethyl derivative of rifamycin S with an aqueous solution of ascorbic acid.

The new derivatives of rifamycin are reddish or yellow orange or yellow substances with a not very well defined decomposition point. They are very slightly soluble in water and show, in comparison with rifamycin S, an increased activity against gram-negative bacteria, yet maintaining the activity against the gram-positive microorganisms. Furthermore they have very low toxicity and show high blood levels by oral administration.

We have recorded in Table 1 the antibacterial data which show the activity of the new compounds. The numbers show the minimal inhibitory concentration of the substances in $\gamma$/ml.

TABLE 1

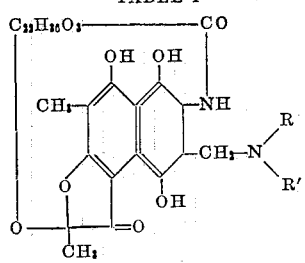

| R | R' | M. aureus | Str. hemol. | Str. faecal. | B. subtilis | $H_{37}Rv$ |
|---|---|---|---|---|---|---|
| —$CH_3$ | —$CH_3$ | 0.015 | -------- | 0.1 | 0.2 | 0.1 |
| —$C_2H_5$ | —$C_2H_5$ | 0.02 | 0.045 | 0.37 | 0.18 | 0.18 |
| —$(CH_2)_4$— | | 0.05 | 0.15 | 0.5 | 0.5 | 0.05 |
| —$(CH_2)_5$— | | 0.05 | 0.5 | 0.5 | 0.2 | 0.1 |
| —$(CH_2)_2$—O—$(CH_2)_2$— | | 0.1 | 0.1 | 0.5 | 0.5 | 0.1 |
| —$(CH_2)_2$—N—$(CH_2)_2$— \| $CH_3$ | | 0.02 | -------- | 0.2 | 0.5 | 0.2 |

Experiments on animals have been also performed. From the next table the $ED_{50}$ in rats with experimental infection induced by *Staphylococcus aureus* and the $LD_{50}$ in rats give important data on the good therapeutic effect "in vivo" and on the low acute toxicity of the prepared compounds.

TABLE 2

| R | R' | Experim. infection on rats by *Staphyl. aureus* ($ED_{50}$, mg./kg.) | | $LD_{50}$, mg./kg. |
|---|---|---|---|---|
| | | Subcutaneous | Per os | |
| —$CH_3$ | —$CH_3$ | 2 | 13.9 | |
| —$C_2H_5$ | —$C_2H_5$ | 6.4 | 12.1 | 205 (i.v.). |
| —$(CH_2)_4$— | | 4.29 | 16 | 190 (i.v.). |
| —$(CH_2)_5$— | | 4 | 7.47 | 183 (i.v.). |
| —$(CH_2)_2$—O—$(CH_2)_2$— | | 9.19 | 9.85 | 188 (i.v.). |
| —$(CH_2)_2$—N—$(CH_2)_2$— \| $CH_3$ | | 6.5 | 16 | |

The N-oxides of these compounds have also been prepared and show comparable activity as shown by the following table.

TABLE 3.—N-OXIDES OF THE COMPOUNDS LISTED IN TABLES 1 AND 2

| R | R' | M. aureus | Str. hemol. | Str. faecal. | B. subtilis | $H_{37}Rv$ |
|---|---|---|---|---|---|---|
| —$CH_3$ | —$CH_3$ | 0.002 | 0.2 | 0.05 | 0.5 | 1 |
| —$C_2H_5$ | —$C_2H_5$ | 0.005 | 0.05 | 0.1 | 0.5 | 1 |
| —$(CH_2)_4$— | | 0.002 | 0.2 | 0.05 | 0.2 | 2 |
| —$(CH_2)_5$— | | 0.005 | 0.05 | 0.01 | 0.1 | 2 |
| —$(CH_2)_2$—O—$(CH_2)_2$— | | 0.001 | 0.1 | 0.05 | 0.2 | 2 |
| —$(CH_2)_2$—N—$(CH_2)_2$— \| $CH_3$ | | 0.002 | 0.05 | 0.01 | 1 | 0.5 |

The following non-limitative examples are illustrative of the invention.

*Example 1.—3-Dimethylaminomethyl-rifamycin SV and N-oxide derivative thereof*

Seven grams of rifamycin S (0.01 mole) are dissolved in 90 ml. of tetrahydrofuran. 18 ml. of a 10% ethanolic solution of dimethylamine (0.04 mole) are then added, followed by 2.3 ml. of a 38–40% aqueous formaldehyde solution (0.03 mole). After refluxing for 4 hours, the solvents are concentrated under vacuum and 200 ml. of ethyl acetate are then added. The solution is treated with 200 ml. of a 2% ascorbic acid aqueous solution and thoroughly agitated. After two water washings the ethyl acetate layer is treated with one half its volume of ligroin and then concentrated to 100 ml. A crude product (7.1 g.) is obtained, which is purified chromatographically on Kieselgel (eluent: ethyl acetate/ethanol 1:1). Yield 1.3 g. of pure product (17%). M.P. 189° C. (decomposition): $\lambda max = 314\ m\mu$ ($E^{1\%}_{1\ cm.} = 210.0$) and 448 m$\mu$ ($E^{1\%}_{1\ cm.} = 189.9$)

To a solution of 20 g. of 3-dimethylaminomethyl rifamycin SV in 230 ml. of ethyl acetate, 2.2 ml. of 35% $H_2O_2$ and 3.5 ml. of triethylamine are added at 0° C. with stirring. The mixture is left for 3 days at 4° C. then shaken with 230 ml. of phosphate buffer solution at pH 7.3. The organic layer is extracted again with an equal portion of buffer solution and the combined aqueous extracts are washed with ethyl acetate. Then 20 g. of ascorbic acid are added and the acidic form of the N-oxide is extracted with ethyl acetate. The solution is dried and evaporated to a small volume, an equal volume of ligroin is added and after evaporation to a small volume the product is collected by filtration. Yield 4.4 g., M.P. 165° C. (dec.) $\lambda max = 316\ m\mu$ ($E^{1\%}_{1\ cm.} = 217.2$) and 452 m$\mu$ ($E^{1\%}_{1\ cm.} = 159.5$)

All absorptions in this and in the subsequent examples were determined in phosphate buffer at pH 7.28.

*Example 2.—3-Diethylaminomethyl-rifamycin SV*

Seven grams (0.01 mole) of rifamycin S are dissolved in 50 ml. of absolute ethanol; then 2.1 ml. of diethylamine (0.02 mole) and 2.3 ml. of 38–40% aqueous formaldehyde solution are added.

After refluxing for 5 hours, the solution is concentrated to 10 ml. and diluted with 100 ml. of ethyl acetate. The organic solution is extracted 5–6 times with the same volume of water buffered at pH 7–7.5 containing sodium ascorbate (2–3%) in order to eliminate rifamycin SV which may have formed during the reaction. After three washings with water, the ethyl acetate solution is concentrated to one half its volume. By cooling at 0–5° C. 1.6 g. of 3-diethylaminomethyl rifamycin SV crystallises (yield 20%). The compound is yellowish-orange and possesses the following characteristics: M.P. 186–8° C. (dec.) $\lambda max = 315\ m\mu$ ($E^{1\%}_{1\ cm.} = 236.7$) and 445 m$\mu$ ($E^{1\%}_{1\ cm.} = 180$)

*Example 3.—3-Pyrrolidinomethyl-rifamycin SV and N-oxide derivative thereof*

To a solution of 7 g. of rifamycin S (0.01 mole) in 50 ml. of tetrahydrofuran 1.7 ml. (0.02 mole) of pyrrolidine, then 2.3 ml (0.03 mole) of a formaldehyde aqueous solution at 38–40% (0.03 mole) are added. After 42 hours at room temperature, the solution is concentrated to about 15 ml. The concentrate is poured ino 35 ml. of 10% aqueous solution of ascorbic acid at 5–10° C. The solution is extracted after a few minutes with ethyl acetate and the extract concentrated after addition of one half its volume of ligroin. The first, very impure crop is discarded, then by further concentration, the Mannich base is obtained which is subsequently crystallised from $H_2O$-ethanol.

The yellowish-orange compound, yield 1.6 g. (20%)

has the following characteristics: M.P. 160° C. (dec.), λmax=314 mμ

($E_{1\,cm.}^{1\%}$=228) and 445 mμ ($E_{1\,cm.}^{1\%}$=172)

To a solution of 3-pyrrolidinomethyl rifamycin SV in ethyl acetate cooled at 0° C., 2.38 ml. of 35% $H_2O_2$ and 3.48 ml. of triethylamine are added with stirring. The solution is maintained at 4° C. for 24 hrs., then poured into 130 ml. of phosphate buffer solution at pH 7.3. The aqueous layer is separated and the ethylacetate solution is treated with a second portion of phosphate buffer solution. The combined extracts are washed with ethyl acetate and then treated with 10 g. of ascorbic acid. The acidic form of the N-oxide is extracted with ethyl acetate. The organic solution is dried and evaporated to a small volume. The 3-pyrrolidinomethyl rifamycin SV N-oxide crystallizes and is collected by filtration and dried in vacuo. Yield 5.2 g. (26%). The product decomposes at 180° C.; λmax=316 mμ

($E_{1\,cm.}^{1\%}$=236.9) and 453 mμ ($E_{1\,cm.}^{1\%}$=167.6)

*Example 4.—3-Piperidinomethyl-rifamycin SV and N-oxide derivative thereof*

To a solution of 7 g. of rifamycin S (0.01 mole) in 50 ml. of tetrahydrofuran, 1.97 ml. (0.02 mole) of piperidine, then 2.3 ml. of aqueous solution of formaldehyde at 38–40% (0.03 mole) are added.

After 6 days at room temperature, the solution is poured into 70 ml. of a 10% aqueous solution of ascorbic acid at 5–10° C. After 10–15 minutes stirring, the solution is concentrated to about one half its volume and the product is extracted with ethyl acetate. The organic extract (about 300 ml.) after washing with water and addition of one half its volume ligroin, is partially concentrated; a first impure crop is discarded. On further concentration a yellow product precipitates and is collected, washed and dried to yield 3.6 g. (45%).

($E_{1\,cm.}^{1\%}$=448 mμ=168.5)

*Examples 5 to 14*

By a process substantially identical with the one described in the above examples, the aminomethyl derivatives of rifamycin SV with the following bases were prepared, of which the properties are given in the table.

TABLE 4

| Base condensed with rifamycin S | M.P., °C. (dec.) | λmax. in mμ | $E_{1\,cm.}^{1\%}$ |
|---|---|---|---|
| 5. Morpholine | 170–180 | 316 / 450 | 251.8 / 176.6 |
| 6. N-methyl-N-(2-hydroxyethyl)-amine | ~170 | 314 / 447 | 241.8 / 183.9 |
| 7. 2,6-dimethylpiperidine | 200–205 | 314 / 450 | 234.1 / 179.3 |
| 8. 1-methylpiperazine | ~220 | 314 / 450 | 260.5 / 174.6 |
| 9. 4-piperidinecarboxylic acid | ~170 | 314 / 450 | 207.5 / 157.5 |
| 10. 2,5-dihydroxymethyl-pyrrolidine | 190–195 | 314 / 447 | 207.5 / 152.1 |
| 11. N-methyl-cyclohexyl-amine | 202–205 | 314 / 446 | 217.7 / 170.3 |
| 12. 2-methylpiperidine | 200–203 | 314 / 448 | 225.2 / 174.0 |
| 13. 4-methylpiperidine | ~180 | 314 / 448 | 219.0 / 174.9 |
| 14. N-methylglycine (TEA salt) | 160–180 | 314 / 448 | 201.0 / 152.9 |

We claim:

1. A process for preparing an aminomethyl derivative of rifamycin SV, which comprises refluxing rifamycin S in an inert organic solvent with at least two equimolecular amounts of formaldehyde and an excess over an equimolecular amount of a secondary nitrogen base selected from an amine of the formula

wherein R is lower alkyl, R' is a member of the class consisting of lower alkyl, hydroxy-lower alkyl, carboxy-lower alkyl and cycloalkyl groups and a heterocyclic compound of the formula

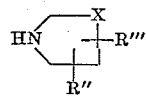

wherein X is a member of the class consisting of methylene, ethylene, the group —$CH_2O$— and the group —$CH_2NH$—, R″ and R‴ are members of the class consisting of hydrogen, lower alkyl, hydroxy and carboxy groups, and contacting the obtained aminomethyl derivative of rifamycin S with an aqueous solution of ascorbic acid.

2. A process for preparing the N-oxide of an aminomethyl derivative of rifamycin SV which comprises refluxing rifamycin S in an inert organic solvent with at least two equimolecular amounts of formaldehyde and an excess over an equimolecular amount of a secondary nitrogen base selected from an amine of the formula

wherein R is lower alkyl, R' is a member of the class consisting of lower alkyl, hydroxy-lower alkyl, carboxy-lower alkyl and cycloalkyl groups and a heterocyclic compound of the formula

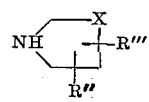

wherein X is a member of the class consisting of methylene, ethylene, the group —$CH_2O$— and the group —$CH_2NH$—, R″ and R‴ are members of the class consisting of hydrogen, lower alkyl, hydroxy and carboxy groups, contacting the obtained aminomethyl derivative of rifamycin S with an aqueous solution of ascorbic acid and subjecting the obtained aminomethyl derivative of rifamycin SV to oxidation with an aqueous hydrogen peroxide at room temperature in the presence of a tertiary aliphatic nitrogen base.

3. A compound selected from aminomethyl derivatives of rifamycin SV of the formula

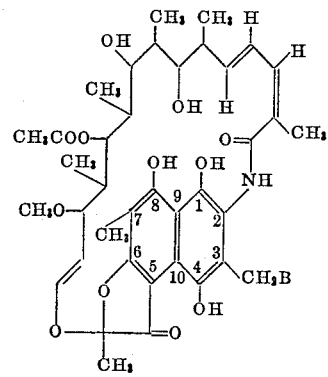

wherein B is a radical selected from the group consisting of

and

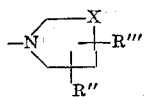

in which R is lower alkyl, R' is a member of the class consisting of lower alkyl, hydroxy-lower alkyl, carboxy-lower alkyl and cycloalkyl groups, X is a member of the class consisting of methylene, ethylene, the group —CH₂O— and the group —CH₂NH—, while R'' and R''' are members of the class consisting of hydrogen, lower alkyl, hydroxy and carboxy groups, and the N-oxide of said aminomethyl derivatives of rifamycin SV.

4. 3-Dimethylaminomethyl-rifamycin SV.
5. 3-Dimethylaminomethyl-rifamycin SV N-oxide.
6. 3-Pyrrolidinomethyl-rifamycin SV.
7. 3-Pyrrolidinomethyl-rifamycin SV N-oxide.
8. 3-Piperidinomethyl-rifamycin SV.
9. 3-Piperidinomethyl-rifamycin SV N-oxide.

No references cited.

WALTER A. MODANCE, *Primary Examiner.*
ROBERT T. BOND, *Assistant Examiner.*